(12) United States Patent
Nakasaki et al.

(10) Patent No.: US 10,746,305 B2
(45) Date of Patent: Aug. 18, 2020

(54) COMPRESSOR SYSTEM

(71) Applicant: MITSUBISHI HEAVY INDUSTRIES COMPRESSOR CORPORATION, Tokyo (JP)

(72) Inventors: Keita Nakasaki, Hiroshima (JP); Tsukasa Shimakawa, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 93 days.

(21) Appl. No.: 16/067,019

(22) PCT Filed: Mar. 3, 2016

(86) PCT No.: PCT/JP2016/056634
§ 371 (c)(1),
(2) Date: Jun. 28, 2018

(87) PCT Pub. No.: WO2017/149729
PCT Pub. Date: Sep. 8, 2017

(65) Prior Publication Data
US 2019/0003597 A1    Jan. 3, 2019

(51) Int. Cl.
*F04B 17/00*         (2006.01)
*F16J 15/44*         (2006.01)
(Continued)

(52) U.S. Cl.
CPC ............ *F16J 15/441* (2013.01); *F04B 39/121* (2013.01); *F04D 17/12* (2013.01); *F04D 29/056* (2013.01);
(Continued)

(58) Field of Classification Search
CPC ........ F16J 15/44; F16J 15/144; F04B 39/121; F04B 39/02; F04B 39/123; F04D 17/12;
(Continued)

(56) References Cited

U.S. PATENT DOCUMENTS 4,394,113 A * 7/1983 Bammert ................ F04C 29/02
                                                             418/201.2
5,957,676 A * 9/1999 Peeters ............... C10M 171/008
                                                               184/6.16
(Continued)

FOREIGN PATENT DOCUMENTS

JP    H03-092700 A    4/1991
JP    2013-036387 A   2/2013

OTHER PUBLICATIONS

International Search Report issued in corresponding International Application No. PCT/JP2016/056634 dated May 24, 2016, with translation (2 pages).
(Continued)

*Primary Examiner* — Gilbert Y Lee
(74) *Attorney, Agent, or Firm* — Osha Liang LLP

(57) ABSTRACT

A compressor system includes: a compressor including a rotor that rotates around an axis and a bearing device that supports the rotor; a lubricant tank in which a lubricant is stored; a lubricant supply line through which the lubricant is supplied from the lubricant tank to the bearing device; a lubricant return line through which the lubricant is returned from the bearing device to the lubricant tank; and a seal gas supply line through which a seal gas supplied to the compressor flows and is introduced to the compressor via an inside of the lubricant tank.

3 Claims, 2 Drawing Sheets

(51) Int. Cl.
  *F04D 29/063* (2006.01)
  *F04D 29/12* (2006.01)
  *F04D 29/056* (2006.01)
  *F04D 17/12* (2006.01)
  *F04B 39/12* (2006.01)
  *F04B 39/02* (2006.01)

(52) U.S. Cl.
  CPC .......... *F04D 29/063* (2013.01); *F04D 29/12* (2013.01); *F04D 29/122* (2013.01); *F16J 15/44* (2013.01); *F04B 39/02* (2013.01); *F04B 39/123* (2013.01)

(58) Field of Classification Search
  CPC ...... F04D 29/056; F04D 29/063; F04D 29/12; F04D 29/122
  See application file for complete search history.

(56) References Cited

U.S. PATENT DOCUMENTS

| | | | |
|---|---|---|---|
| 7,413,419 B2* | 8/2008 | De Smedt | F04C 29/02 417/410.4 |
| 2011/0135528 A1* | 6/2011 | Amano | F01C 19/005 418/206.6 |
| 2011/0140418 A1* | 6/2011 | Matsuo | F03D 80/80 290/44 |
| 2014/0178119 A1 | 6/2014 | Shinohara et al. | |

OTHER PUBLICATIONS

Written Opinion of the International Searching Authority issued in corresponding International Application No. PCT/JP2016/056634 dated May 24, 2016, with translation (7 pages).

* cited by examiner

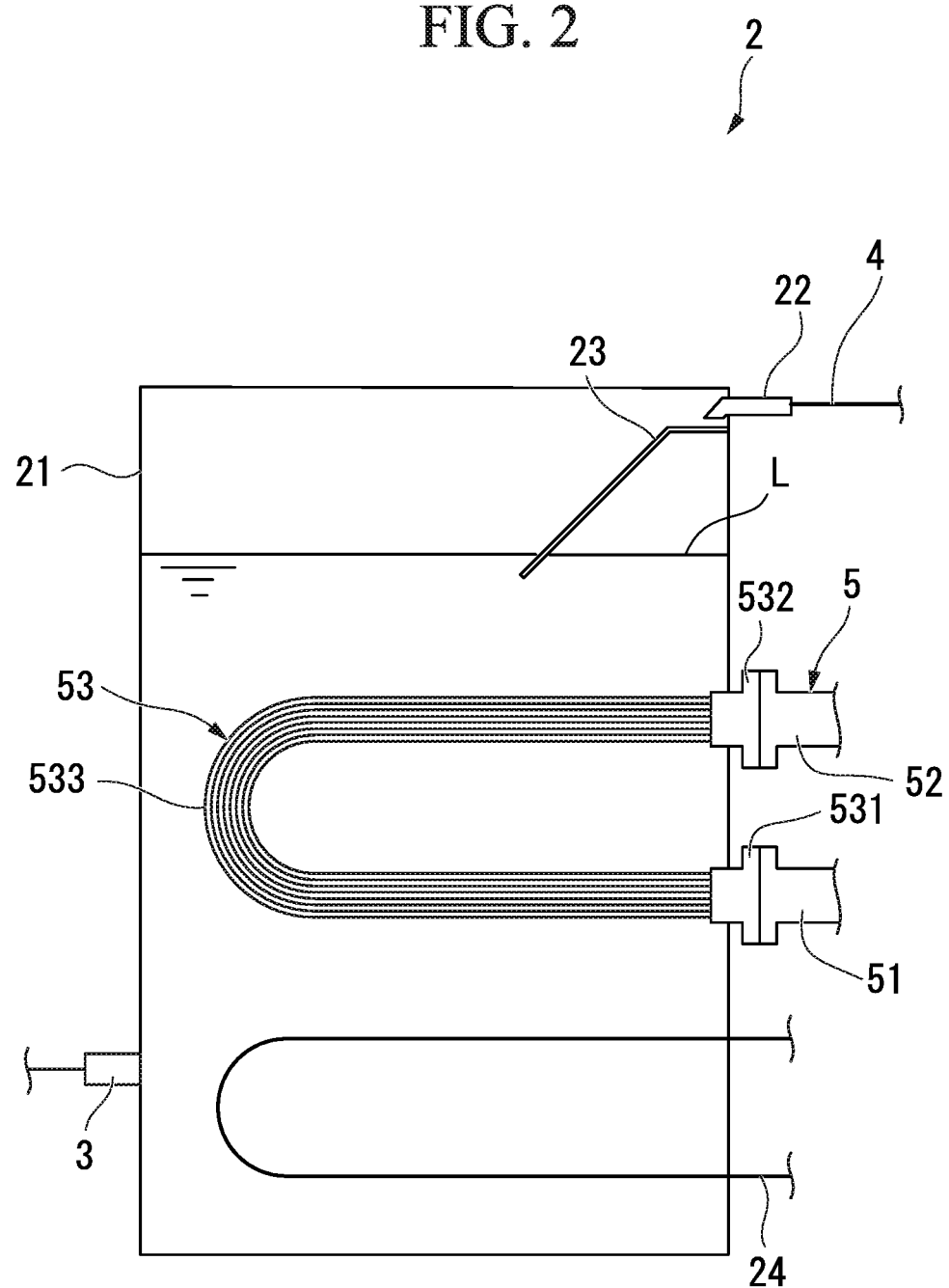

COMPRESSOR SYSTEM

TECHNICAL FIELD

The present invention relates to a compressor system.

BACKGROUND ART

There is a centrifugal compressor in which an end portion of a rotary shaft protrudes to the outside of a casing so as to input or output a rotation of the rotary shaft that is rotatably provided with respect to a casing. In the centrifugal compressor, a dry gas seal is provided so as to inhibit a working fluid from leaking a gap between the rotary shaft and the casing in the end portion of the casing to the outside.

For example, a compressor having the dry gas seal is disclosed in Patent Document 1. The dry gas seal disclosed in Patent Document 1 includes a drive system unit that integrally rotates with a rotary shaft and a stationary system unit that is fixed to a head of a casing. In the dry gas seal, a stationary ring of a stationary system unit is biased toward a rotating ring of the drive system unit by a coil spring. Accordingly, in a state where the compressor is stopped, the stationary ring and the rotating ring abut each other. In addition, a spiral groove is formed on a seal surface of the rotating ring facing the stationary ring. If the rotary shaft rotates in a state where the compressor is operated and a seal gas is supplied, the seal gas is introduced to a portion between the rotating ring and the stationary ring by the spiral groove. The stationary ring is pressed along an axial direction of the rotary shaft against a biasing force of the coil spring by a pressure of the seal gas. As a result, a minute gap is formed between the rotating ring and the stationary ring, and thus, the portion between the rotary shaft and the casing is sealed without inhibiting the rotation of the rotary shaft.

Meanwhile, the seal gas supplied to the dry gas seal flows through the minute gap between the rotating ring and the stationary ring. Accordingly, if a portion of the seal gas is liquefied, the minute gap is clogged, and thus, performance of the dry gas seal greatly deteriorates. Therefore, in order to keep the seal gas at a temperature equal to or more than a dew point, it is necessary to install gas heater for heating the seal gas.

CITATION LIST

Patent Literature

[Patent Document 1] Japanese Unexamined Patent Application, First Publication No. 2013-36387

However, in a case where the gas heater is provided, it is necessary to secure an installation space, and thus, an installation cost increases. Accordingly, it is desirable to warm the seal gas without installing the gas heater.

SUMMARY

One or more embodiments of the present invention provide a compressor system capable of warming the seal gas.

According to one or more embodiments of the present invention, there is provided a compressor system, including: a compressor that includes a rotor that is configured to rotate around an axis and a bearing device that supports the rotor; a lubricant tank in which a lubricant is stored; a lubricant supply line through which the lubricant is supplied from the lubricant tank to the bearing device; a lubricant return line through which the lubricant is returned from the bearing device to the lubricant tank; and a seal gas supply line through which a seal gas to be supplied to the compressor flows and the seal gas is introduced to the compressor via an inside of the lubricant tank.

According to one or more embodiments of this configuration, the seal gas supply line runs through the lubricant tank in which the lubricant returned from the bearing device is stored, and thus, the seal gas can flow through a region that is warmed by the lubricant having a high temperature. As a result, the seal gas can be heated by only causing the seal gas to flowing through the seal gas supply line using the lubricant having a high temperature.

In the compressor system according to one or more embodiments of the present invention, the seal gas supply line may run through a liquefied lubricant stored in the lubricant tank.

According to one or more embodiments of this configuration, the seal gas can flow through the liquefied lubricant. As a result, compared to a case where the seal gas supply line is disposed in a gaseous lubricant, a heat exchange between the seal gas and the lubricant can be effectively performed. Accordingly, it is possible to effectively warm the seal gas.

In the compressor system according to one or more embodiments of the present invention, the lubricant tank may include a lubricant heater that is disposed in a stored liquefied lubricant and is configured to heat the lubricant.

According to one or more embodiments of this configuration, even in a case where a temperature of the lubricant in the lubricant tank is low, it is possible to warm the lubricant. As a result, it is possible to reliably heat the seal gas.

According to one or more embodiments of the present invention, it is possible to warm the seal gas.

BRIEF DESCRIPTION OF DRAWINGS

FIG. 2 is a schematic diagram showing a structure in the vicinity of a lubricant tank in one or more embodiments of the present invention.

DETAILED DESCRIPTION

Figure 1:
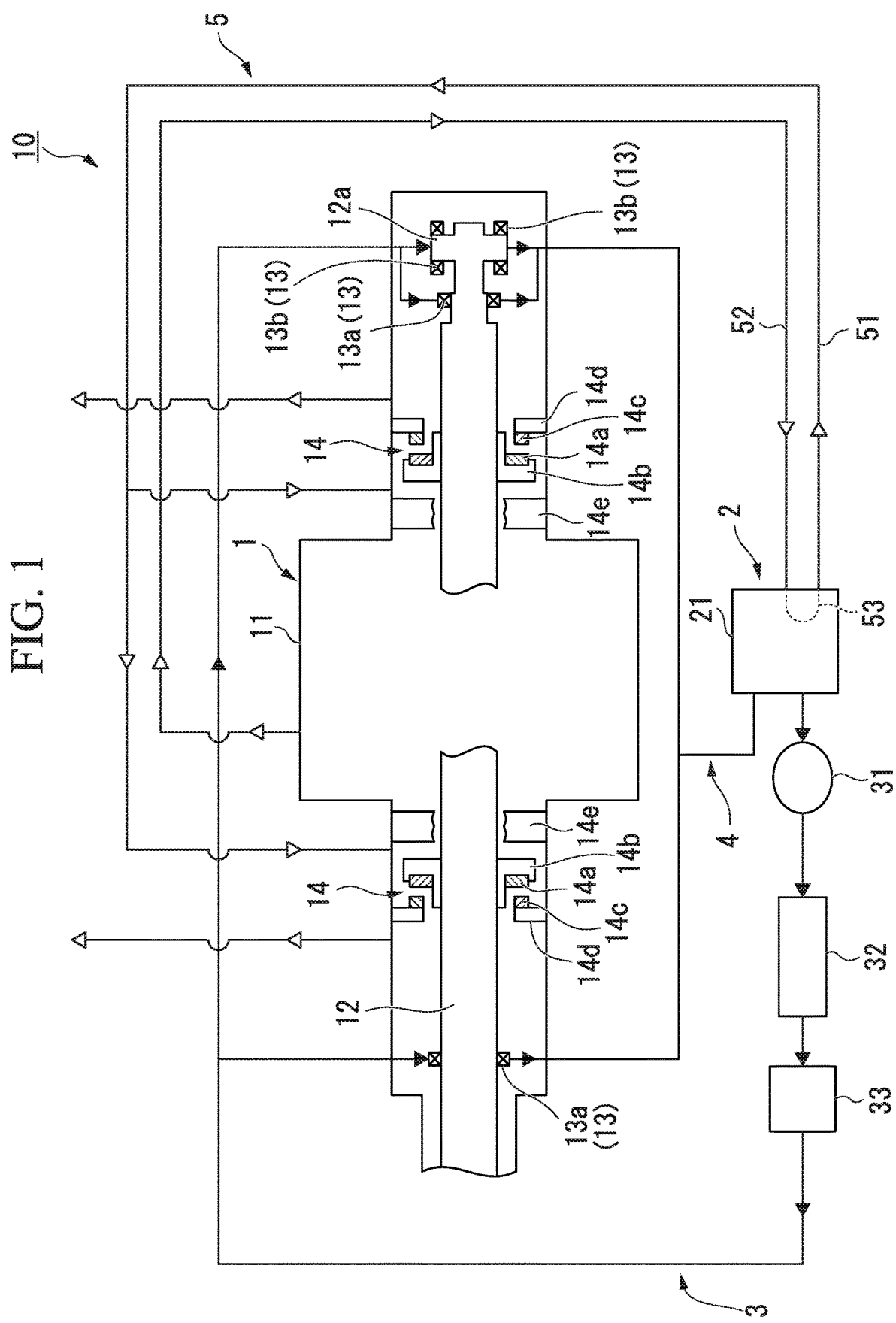
FIG. 1 is a schematic diagram showing a compressor system in one or more embodiments of the present invention.

Hereinafter, a compressor system 10 according to one or more embodiments of the present invention will be described with reference to the drawings.

As shown in FIG. 1, the compressor system 10 includes a compressor 1, a lubricant tank 2, a lubricant supply line 3, a lubricant return line 4, and a seal gas supply line 5.

For example, the compressor 1 according to one or more embodiments of the present invention is a multistage centrifugal compressor. The compressor 1 includes a casing 11, a rotor 12, a bearing device 13, and a dry gas seal portion 14. The compressor 1 sucks air as a working fluid by a rotation of the rotor 12 and generates a compressed fluid. In addition, here, an application of the compressed fluid generated by the compressor 1 is not limited at all.

The rotor 12 is rotatably supported inside the casing 11. Both end portions of the rotor 12 are supported by radial bearings 13a, and thus, the rotor 12 is rotatably supported around a center axis. A thrust collar 12a of which a diameter increases radially outward is formed on one end of the rotor 12. Thrust bearings 13b are provided on both sides of the thrust collar 12a in an axial direction. The thrust bearings 13b restrict displacement of the rotor 12 in the axial direction while rotatably supporting the rotor 12 around the center axis.

Here, in the following descriptions, the radial bearings 13a and the thrust bearings 13b included in the compressor 1 are simply referred to as the bearing device 13.

The dry gas seal portion 14 seals a gap between the casing 11 and the rotor 12 by a seal gas. The dry gas seal portion 14 inhibits the working fluid from leaking from the inside of the casing 11 to the outside thereof by a seal gas. The dry gas seal portion 14 is disposed at a position close to a center position of the rotor 12 in the axial direction from the bearing device 13. The dry gas seal portion 14 includes a rotating ring 14a, a stationary ring 14c, and a labyrinth seal 14e.

The rotating ring 14a is integrally provided with the rotor 12 on an outer peripheral surface of the rotor 12. The rotating ring 14a is disposed at a position close to the center position of the rotor 12 in the axial direction from the bearing device 13. A tubular shaft sleeve 14b is fixed to an outer peripheral surface of the rotor 12. The rotating ring 14a is fixed to the rotor 12 via the shaft sleeve 14b. A spiral groove (not shown) is formed on a seal surface of the rotating ring 14a facing the stationary ring 14c.

The stationary ring 14c is fixed to the casing 11. The stationary ring 14c is disposed at a position close to the bearing device 13 in the axial direction of the rotor 12 from the rotating ring 14a. An annular retainer 14d is provided on an inner peripheral surface of the casing 11 facing the outer peripheral surface of the rotor 12. The stationary ring 14c is fixed to the casing 11 via the retainer 14d. The stationary ring 14c is attached to the retainer 14d by a coil spring (not shown) that is biased toward the rotating ring 14a. The stationary ring 14c is provided so as to oppose the rotating ring 14a in the axial direction of the rotor 12. The stationary ring 14c is pushed toward the rotating ring 14a by the coil spring.

The labyrinth seal 14e is disposed at a position close to the center position of the rotor 12 in the axial direction from the rotating ring 14a. The labyrinth seal 14e is fixed to the casing 11.

A lubricant that is to be supplied to the bearing device 13 is stored in the lubricant tank 2. As shown in FIG. 2, the lubricant tank 2 includes a tank body 21, a drain nozzle 22, a degassing tray 23, and a lubricant heater 24.

The tank body 21 is formed as a hollow box body. In the inside of the tank body 21, a liquefied lubricant is collected in a lower portion and a gaseous lubricant (oil smoke) is collected in the upper portion. The tank body 21 is connected to the lubricant return line 4 via the drain nozzle 22. The drain nozzle 22 is fixed to a portion of the tank body 21 above a liquid surface L of the stored liquefied lubricant. The lubricant supply line 3 is connected to a portion of the tank body 21 below the liquid surface L of the stored lubricant.

The drain nozzle 22 is connected to the lubricant return line 4. A tip portion of the drain nozzle 22 is opened downward inside the tank body 21. The drain nozzle 22 feeds the liquefied lubricant and the gaseous lubricant recovered through the lubricant return line 4 into the lubricant tank 2.

The degassing tray 23 guides the lubricant fed from the drain nozzle 22 into the tank body 21. The degassing tray 23 is formed to approximately horizontally extend from an inner wall surface of the tank body 21 toward the inside of the tank body 21, and thereafter, to be inclined to extend obliquely downward toward the inside of the tank body 21. Accordingly, the liquefied lubricant discharged from the drain nozzle 22 flows along the degassing tray 23 and flows into the lubricant stored in the tank body 21 in advance. In this way, the lubricant flows into the tank body 21 along the degassing tray 23, and thus, bubbles are not easily generated in the lubricant inside the tank body 21.

The lubricant heater 24 heats the lubricant stored in the tank body 21. The lubricant heater 24 is immersed into the stored liquefied lubricant. For example, as the lubricant heater 24 according to one or more embodiments of the present invention, there is a steam heater that is heated by steam supplied from other plants or the like or an electric heater that is heated by electricity.

As shown in FIG. 1, the lubricant is supplied from the lubricant tank 2 to the bearing device 13 through the lubricant supply line 3. The lubricant supply line 3 is connected to the tank body 21. The lubricant supply line 3 is divided to be connected to each of the plurality of bearing devices 13. The lubricant supply line 3 includes a supply pump 31, an oil cooler 32, and an oil filter 33 in a middle thereof.

The supply pump 31 pumps the lubricant stored in the tank body 21 to bearing device 13.

The oil cooler 32 cools the lubricant fed from the supply pump 31.

The oil filter 33 removes foreign matters such as dusts mixed with the lubricant fed from the oil cooler 32.

The lubricant is returned from the bearing device 13 to the lubricant tank 2 through the lubricant return line 4. The lubricant that is used in the bearing device 13 and has a high temperature is recovered by the lubricant return line 4 and is fed to the lubricant tank 2. The lubricant return line 4 is connected to each of the plurality of bearing devices 13. The lubricant return line 4 is connected to the tank body 21.

The seal gas that is to be supplied to the compressor 1 flows through the seal gas supply line 5. The seal gas is introduced to the compressor 1 via the inside the lubricant tank 2 through the seal gas supply line 5. The seal gas supply line 5 according to one or more embodiments of the present invention is disposed in the tank body 21 in a state of being immersed in the liquefied lubricant. The seal gas is supplied to the dry gas seal portion 14 through the seal gas supply line 5. A supply source of the seal gas is supplied from the casing on the discharge side of the compressor 1. The seal gas used in the dry gas seal portion 14 is fed to a flare to be combusted. Specifically, the seal gas supply line 5 includes a supply line 51, a recovery line 52, and an in-tank line 53.

The seal gas is supplied to the dry gas seal portion 14 through the supply line 51. In the supply line 51, the seal gas is supplied from a portion between the rotating ring 14a and the labyrinth seal 14e to the inside the casing 11.

A portion of the working fluid compressed by the compressor 1 is recovered as the seal gas from the inside of the casing 11 through the recovery line 52.

The in-tank line 53 is connected to the supply line 51 and the recovery line 52. As shown in FIG. 2, the in-tank line 53 is disposed to penetrate the liquefied lubricant stored in the lubricant tank 2. The in-tank line 53 includes a first header portion 531, a second header portion 532, and a heat exchange portion 533.

The first header portion 531 is fixed to a side surface of the lubricant tank 2. The first header portion 531 is connected to the supply line 51.

The second header portion 532 is disposed above the first header portion 531. The second header portion 532 is fixed to the side surface of the lubricant tank 2 that is the same as a side to which the first header portion 531 is fixed. The second header portion 532 is connected to the supply line 51.

The seal gas passing through the heat exchange portion 533 and the lubricant around the heat exchange portion 533 are heat-exchanged by the heat exchange portion 533. For example, the heat exchange portion 533 is formed to have a length that allows the seal gas to heat-exchange with the lubricant until the seal gas reaches a temperature exceeding a dew point. The heat exchange portion 533 is connected to the first header portion 531 and the second header portion 532. The heat exchange portion 533 is formed such that a heat transfer area thereof increases. The heat exchange portion 533 according to one or more embodiments of the present invention is formed of a plurality of pipes.

In addition, the heat exchange portion 533 is not limited to the plurality of pipes as long as it is formed such that the temperature of the seal gas reaches a temperature exceeding the dew point and the heat transfer area increases. For example, the heat exchange portion 533 may be one pipe. In this case, the heat exchange portion 533 may be formed in a spiral shape or irregularities are formed on the surface of the heat exchange portion 533 so as to increase the heat transfer area.

In the above-described compressor system 10, when the compressor 1 is activated, the lubricant heater 24 is operated to heat the lubricant stored in the tank body 21. Accordingly, for example, the lubricant having a temperature that is approximately the same as the outside temperature of approximately 20° C. is heated, and the lubricant is heated to reach approximately 40° C. to 50° C. The heated lubricant is supplied to the bearing device 13 through the lubricant supply line 3. Specifically, the lubricant is pumped by the supply pump 31, and thus, the lubricant passes through the oil cooler 32 and the oil filter 33 and is fed to the bearing device 13. The lubricant supplied to the bearing device 13 is used in the bearing device 13, and thus, the temperature of the lubricant increases to approximately 60° C. to 70° C. The heated lubricant is returned to the lubricant tank 2 through the lubricant return line 4. The lubricant returned to the lubricant tank 2 flows into the tank body 21 via the degassing tray 23 from the drain nozzle 22 connected to the lubricant return line 4. Thereafter, bubbles or the like inside the liquefied lubricant stored in the tank body 21 are extracted, and thus, the temperature of the lubricant gradually decreases. Thereafter, the lubricant of which the temperature has decreased to approximately 50° C. is fed to the bearing device 13 again through the lubricant supply line 3.

In addition, after the lubricant heater 24 heats the lubricant when the compressor 1 is activated, the lubricant heater 24 is stopped.

In this case, the seal gas is supplied to the dry gas seal portion 14 through the seal gas supply line 5. Specifically, the seal gas is heat-exchanged with the lubricant heated by the lubricant heater 24, and thus, the temperature of the seal gas in the heat exchange portion 533 increases to approximately 20° C. to 40° C. The heated seal gas is fed from the heat exchange portion 533 to the supply line 51 via the first header portion 531. The seal gas fed to the supply line 51 is supplied to the dry gas seal portion 14. The seal gas supplied to the dry gas seal portion 14 flows through the portion between the rotating ring 14a and the stationary ring 14c and is used to seal a gap between the casing 11 and the rotor 12. The seal gas used in the dry gas seal portion 14 is fed to the flare that is a device for combusting the gas.

Meanwhile, a portion of the working fluid that is newly recovered from the inside of the casing 11 is fed from the recovery line 52 to the heat exchange portion 533 via the second header portion 532, as the seal gas. In the in-tank line 53, the seal gas is heated again by the heat exchange portion 533. In this way, the seal gas runs through the lubricant tank 2, and thus, the seal gas heated and is fed to the dry gas seal portion 14.

According to the above-described compressor system 10, the lubricant is returned from the bearing device 13 to the lubricant tank 2 through the lubricant return line 4, and thus, the temperature of the lubricant stored in the tank body 21 increases. Accordingly, the heat exchange portion 533 is disposed in the tank body 21 that stores the lubricant returned from the bearing device 13, and thus, the seal gas can flow through a region that is warmed by the lubricant having a high temperature. As a result, the seal gas can be heated to reach the temperature that is approximately the same as the temperature of the lubricant by only causing the seal gas to flow through the heat exchange portion 533. Accordingly, the seal gas can be heated by only causing the seal gas to flowing through the seal gas supply line using the lubricant having a high temperature without using a dedicated heating device such as a gas heater for warming the seal gas in the seal gas supply line 5. Therefore, it is possible to warm the seal gas without providing a new heating device.

In addition, the heat of the lubricant is transmitted to the seal gas by performing the heat exchange between the lubricant and the seal gas, and thus, the temperature of the lubricant decreases. Accordingly, a width of the temperature of the lubricant to be cooled by the oil cooler 32 decreases. As a result, even when a size of the oil cooler 32 decreases, the lubricant can be cooled to a predetermined temperature.

In one or more embodiments, the heat exchange portion 533 is disposed to be immersed into the liquefied lubricant stored in the tank body 21. Accordingly, the seal gas can flow through the lubricant having a high temperature. As a result, compared to a case where the heat exchange portion 533 is disposed in a gaseous lubricant, the heat exchange between the seal gas and the lubricant can be effectively performed. Accordingly, it is possible to effectively warm the seal gas.

When the compressor 1 is activated, the lubricant has not been used yet in the bearing device 13, and thus, the lubricant having a high temperature is not fed from the lubricant return line 4. Accordingly, the liquefied lubricant stored in the tank body 21 has a low temperature that is approximately the same as that of the outside air. Meanwhile, the lubricant heater 24 is disposed in the liquefied lubricant, and thus, the lubricant can be directly warmed. Accordingly, like when the compressor is activated, even in a case where the lubricant having a high temperature is not fed from the bearing device 13 and the temperature of the lubricant in the tank body 21 is low, it is possible to warm the lubricant. As a result, it is possible to reliably heat the seal gas.

Hereinbefore, embodiments of the present invention are described with reference to the drawings. However, configurations in the embodiments and a combination thereof are examples, and various modifications such as addition, omission, replacement, and other modifications of configurations can be applied within a scope which does not depart from the gist of the present invention. In addition, the present invention is not limited by the embodiments and is limited by only claims.

In addition, the seal gas supply line 5 is not limited to the embodiments in which the working fluid of the compressor 1 is used as the seal gas. That is, the seal gas supply line 5 is not limited as long as the seal gas can be supplied to the compressor 1 through the seal gas supply line via the inside of the lubricant tank 2. For example, the seal gas supply line 5 may have a structure in which the seal gas is supplied from the supply source of the seal gas to the compressor 1 via the inside of the lubricant tank 2, is not circulated, and is discharged.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

According to the above-described compressor system 10, it is possible to warm the seal gas.

REFERENCE SIGNS LIST

10: compressor system
1: compressor
11: casing
12: rotor
12*a*: thrust collar
13: bearing device
13*a*: radial bearing
13*b*: thrust bearing
14: dry gas seal portion
14*a*: rotating ring
14*b*: shaft sleeve
14*c*: stationary ring
14*d*: retainer
14*e*: labyrinth seal
2: lubricant tank
21: tank body
22: drain nozzle
23: degassing tray
24: lubricant heater
L: liquid surface
3: lubricant supply line
31: supply pump
32: oil cooler
33: oil filter
4: lubricant return line
5: seal gas supply line
51: supply line
52: recovery line
53: in-tank line
531: first header portion
532: second header portion
533: heat exchange portion

What is claimed is:

1. A compressor system, comprising:
   a compressor that includes:
      a rotor that rotates around an axis; and
      a bearing device that supports the rotor;
   a lubricant tank in which a lubricant is stored;
   a lubricant supply line through which the lubricant is supplied from the lubricant tank to the bearing device;
   a lubricant return line through which the lubricant is returned from the bearing device to the lubricant tank; and
   a seal gas supply line through which a seal gas supplied to the compressor flows and is introduced to the compressor via an inside of the lubricant tank, wherein
   the seal gas supply line comprises a pipe that is disposed in and passes through the inside of the lubricant tank.

2. The compressor system according to claim 1, wherein the pipe of the seal gas supply line runs through a liquefied lubricant stored in the lubricant tank.

3. The compressor system according to claim 1, wherein the lubricant tank includes a lubricant heater disposed in a stored liquefied lubricant and that heats the lubricant.

\* \* \* \* \*